United States Patent Office 2,766,123
Patented Oct. 9, 1956

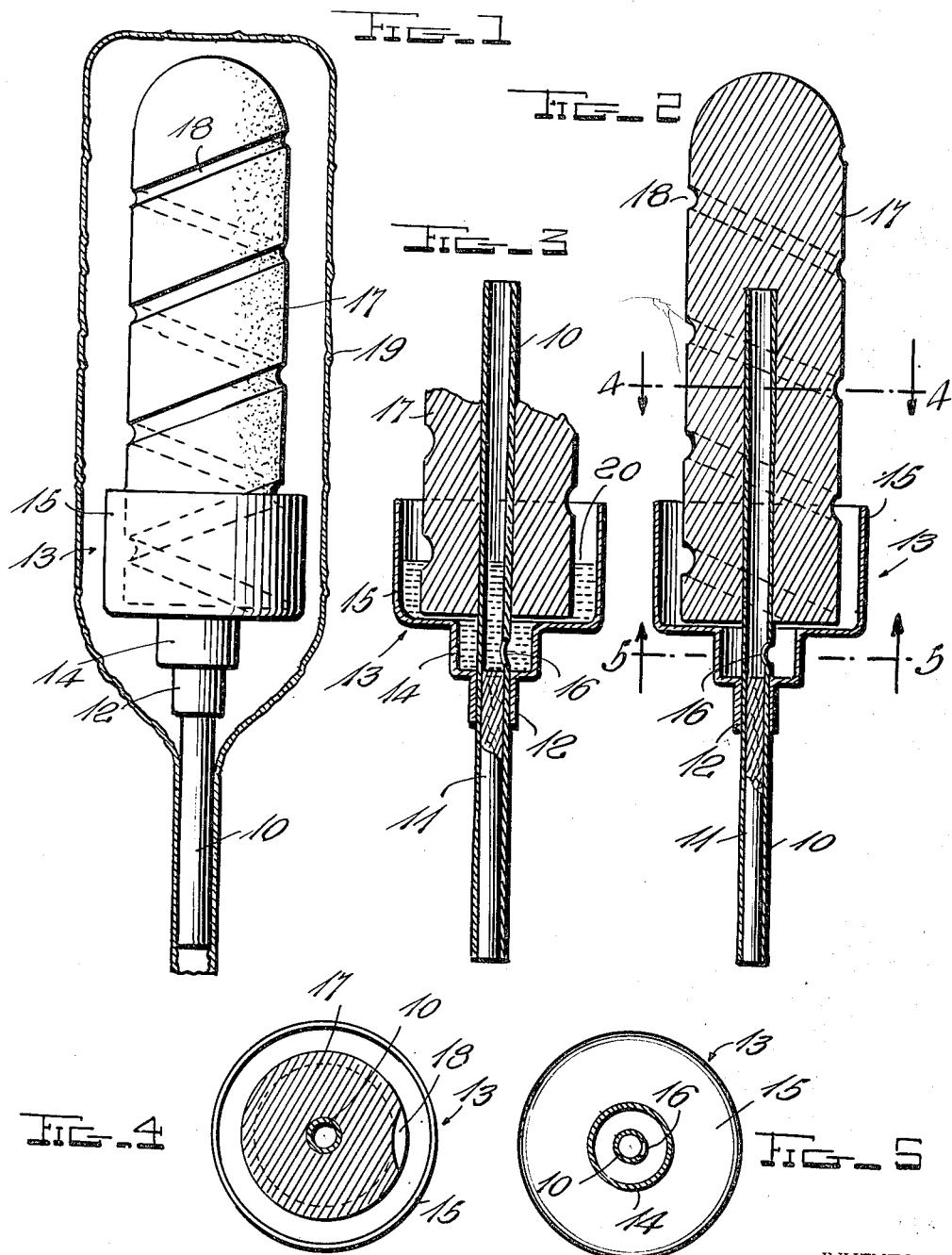

2,766,123

COMBINED FROZEN CONFECTION, CUP AND PIPETTE

Esber E. Moubayed, Washington, D. C.

Application July 22, 1954, Serial No. 445,011

6 Claims. (Cl. 99—137)

The present invention relates to a combined frozen confection, cup and pipette and it consists in the combinations, constructions and arrangements of parts herein described and claimed.

Generally there is provided a frozen confection which is mounted upon a pipette or straw, the lower end of which is plugged with a cylindrical piece of wood or the like and to which a cup of paper or like material is attached to receive melted drippings from the confection. The confection itself is generally cylindrical but provided with a spiral groove upon its outer periphery which acts to lead the drippings to the cup. The lowermost portion of the pipette which lies within the cup is provided with a lateral opening so that, when the frozen confection has been either eaten or melted, that part thereof which remains as a liquid and which has been caught by the cup may be withdrawn therefrom by utilizing the upper end of the pipette in conventional manner to withdraw the liquid into the mouth of the user.

It is accordingly an object of the invention to provide a novel combined frozen confection, cup and combined support and pipette therefor.

Another object of the invention is to provide, in a device of the character set forth, novel supporting means for a frozen confection.

Another object of the invention is to provide, in a device of the character set forth, a novel pipette forming a part of the invention.

Still another object of the invention is to provide a device of the character set forth which is simple in construction, inexpensive to manufacture and yet effective and efficient in use.

Other and further objects of the invention will become apparent from a reading of the following specification taken in conjunction with the drawing, in which:

Figure 1 is a vertical elevational view, partly in section, of an embodiment of the invention, Figure 2 is a vertical sectional view, partly in elevation, of the device illustrated in Figure 1.

Figure 3 is a view similar to Figure 2 but illustrating the operation of a cup and pipette forming a part of the invention, Figure 4 is a sectional view taken along line 4—4 of Figure 2, and Figure 5 is a sectional view taken along line 5—5 of Figure 2.

Referring more particularly to the drawing, there is shown therein a device of the character set forth comprising a pipette 10 which may be composed of a relatively stiff cardboard, plastic composition or the like and which is preferably treated in any suitable manner to make the same waterproof. In the lower end portion of the pipette 10 there is affixed through frictional contact a cylindrical plug 11 which may be of wood or other inexpensive material.

Surrounding the pipette 10 adjacent the upper end portion of the plug 11 is a collar 12 to the upper end of which is integrally formed a cup generally designated at 13. The cup 13 is composed of a lower portion 14 of relatively small diameter and an integrally formed upper portion 15 of relatively large diameter. In that portion of the pipette 10 which is located in the lowermost portion 14 of the cup 13 there is provided a lateral opening 16.

A frozen confection 17 of generally cylindrical shape is affixed to the upper portion of the pipette 10 and extends downwardly into the upper portion 15 of the cup 13. Preferably, the confection 17 is frozen in position upon the pipette 10.

A spiral groove is formed in the outer periphery of the confection 17 during the molding process thereof and the whole device may be placed in a bag 19 when ready for sale and distribution.

In use, it will be apparent that when the bag 19 is removed from the remainder of the device, that the same may be held in one hand by the user by grasping the lower portion of the pipette, that is to say that portion thereof in which the plug 11 is located whereupon the confection 17 may be eaten in usual manner. As usually occurs, a goodly portion of the confection 17 will melt and will eventually descend into the cup 13, thereby preventing the same from soiling the clothing and/or hands of the user. At the same time, it will be apparent that such drippings will be led into the groove 18 for their eventual disposal within the cup 13, and that in this manner large drops of melted confection will not accumulate in size as they so descend since the groove provides a natural channel for such drippings to deliver the same to the cup 13. This liquid is indicated at 20 in Figure 3 wherein the confection 17 is shown as having been partly consumed and partly melted. At this time, the user may place the upper end of the pipette 10 which has thus become exposed, in his mouth whereupon he may withdraw the liquid 20 through the opening 16 and upwardly through the pipette 10 into his mouth by suction in the conventional manner. Alternatively, he may wait until the entire cup 13 has become filled before withdrawing the fluid 12 in the manner described. It will also be apparent that the reduced portion 14 will allow a greater amount of fluid to thus be withdrawn since it requires but a small volume to raise the level of fluid in the portion 14 to cover the opening 16 and thus provide the necessary suction action. At the same time, the relatively large portion 15 of the cup 13 will act to catch all drippings from the confection 17.

While but one form of the invention has been shown and described herein, it will be readily apparent to those skilled in the art that many minor modifications may be made without departing from the spirit of the invention or the scope of the appended claims.

What is claimed is:

1. A device of the character described comprising a pipette, a cylindrical plug mounted in the lower end of said pipette, a cup affixed to and surrounding said pipette at that portion thereof adjacent the upper end of said plug, and a frozen confection mounted upon the upper end of said pipette and extending downwardly into said cup, said pipette having a lateral opening therein adjacent the bottom of said cup.

2. A device of the character described comprising a pipette, a cylindrical plug mounted in the lower end of said pipette, a collar affixed to and surrounding said pipette at that portion thereof adjacent the upper end of said plug, a cup formed integrally with the upper end of said collar, and a frozen confection mounted upon the upper end of said pipette and extending downwardly into said cup, said pipette having a lateral opening therein adjacent the bottom of said cup.

3. A device of the character described comprising a pipette, a cylindrical plug mounted in the lower end of said pipette, a collar affixed to and surrounding said pipette at that portion thereof adjacent the upper end of said plug, a cup formed integrally with the upper end of said collar, said cup having a lower portion of relatively small diameter, and an upper portion of relatively large diameter, and a frozen confection mounted upon the upper end of said pipette and extending downwardly into said cup, said pipette having a lateral opening therein adjacent the bottom of said cup.

4. A device of the character described comprising a pipette, a cylindrical plug mounted in the lower end of said pipette, a cup affixed to and surrounding said pipette at that portion thereof adjacent the upper end of said plug, and a frozen confection mounted upon the upper end of said pipette and extending downwardly into said cup, said pipette having a lateral opening therein adjacent the bottom of said cup, said confection being of generally cylindrical shape and having a spiral groove in the outer periphery thereof.

5. A device of the character described comprising a pipette, a cylindrical plug mounted in the lower end of said pipette, a collar affixed to and surrounding said pipette at that portion thereof adjacent the upper end of said plug, a cup formed integrally with the upper end of said collar, and a frozen confection mounted upon the upper end of said pipette and extending downwardly into said cup, said pipette having a lateral opening therein adjacent the bottom of said cup, said confection being of generally cylindrical shape and having a spiral groove in the outer periphery thereof.

6. A device of the character described comprising a pipette, a cylindrical plug mounted in the lower end of said pipette, a collar affixed to and surrounding said pipette at that portion thereof adjacent the upper end of said plug, a cup formed integrally with the upper end of said collar, said cup having a lower portion of relatively small diameter, and an upper portion of relatively large diameter, and a frozen confection mounted upon the upper end of said pipette and extending downwardly into said cup, said pipette having a lateral opening therein adjacent the bottom of said cup, said confection being of generally cylindrical shape and having a spiral groove in the outer periphery thereof.

References Cited in the file of this patent

UNITED STATES PATENTS

| 1,761,703 | Brimer | June 3, 1930 |
| 1,947,872 | Nolte | Feb. 20, 1934 |
| 2,632,708 | Suiskind | Mar. 24, 1953 |

FOREIGN PATENTS

| 9,623 | Great Britain | 1905 |